J. J. Smith,
Making Staves.
Nº 135.    Patented Mar. 3, 1837.
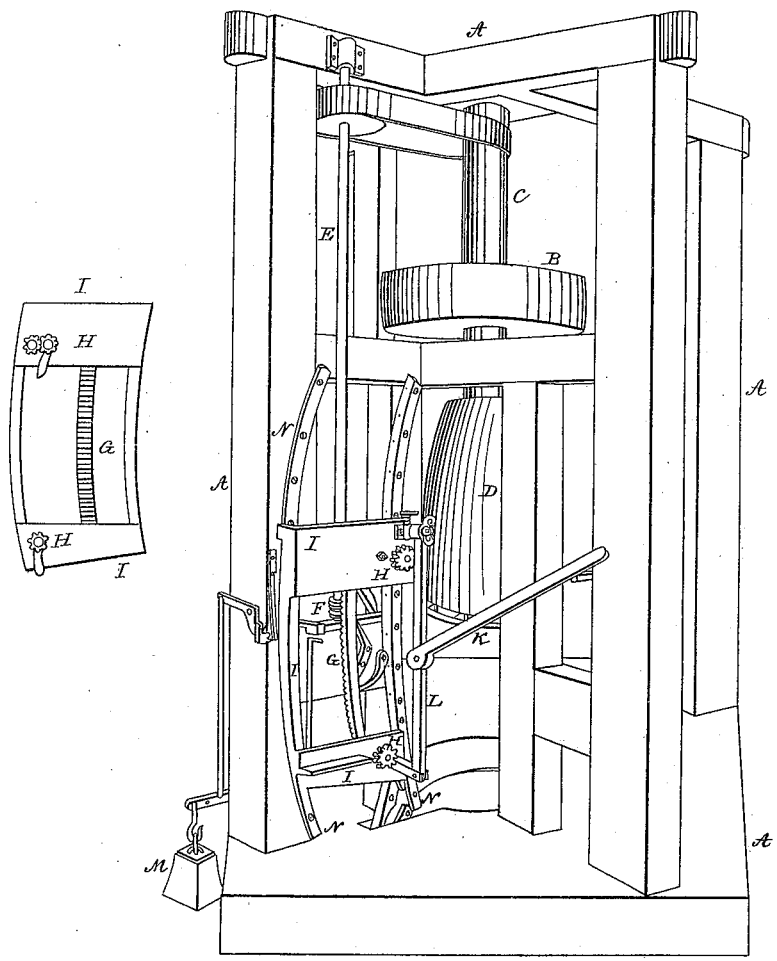
Witnesses:
Wm W Beach
John Evans
Inventor:
Jesse J Smith

UNITED STATES PATENT OFFICE.

JESSE J. SMITH, OF BRUTUS, NEW YORK.

MACHINE FOR SAWING STAVES FOR BARRELS, KEGS, &c.

Specification of Letters Patent No. 135, dated March 5, 1837.

*To all whom it may concern:*

Be it known that I, JESSE J. SMITH, of Brutus, in the county of Cayuga and State of New York, have invented an improvement in Machinery for Sawing Staves by Means of a Barrel-Saw, and that the following is a full and exact description thereof.

The saw which I use is made in the form of a half barrel, or of that which would be produced by cutting a barrel, transversely, through the middle of the bulge and elongating such section in a duplicate proportion; that end of such barrel-saw which is the largest in diameter, is to be serrated, so as to form the cutting edge; this diameter must be equal, or nearly so, to that of the barrel, or other vessel, for which the staves are to be used, and the length of such barrel-saw should somewhat exceed that of the required staves. This saw is firmly fixed by its smaller end to a shaft, or spindle, which is to revolve vertically, the cutting edge of the saw being downwards.

Within the revolving saw there is a stationary block of wood, of the same form with the saw, and of such size as to be nearly in contact with the whole interior thereof, allowing such space as will merely admit the latter to revolve freely around it. This block descends a short distance below the cutting edge of the saw, and is sustained securely upon a part of the frame work of the machine. It is intended, usually, to cut four staves at once by this saw; it may be adapted, however, to the cutting of two, or three, only; but it is to be understood that one of its principal characteristics is its applicability, and its application, to the cutting of more than one, both its utility and steady action being mainly dependent upon its so doing.

In describing this machine, I shall consider it as constructed for the cutting of four. The block, above described as fitting into the cavity of the revolving saw, is to be grooved, or channeled, from end to end, so as to receive the four staves as they are cut; these channels being a little wider than the width, and a little deeper than the thickness, of the sawed staves. The stuff to be cut is first sawed into plank of the proper thickness, is then cross-cut to the exact length, and being sustained upon carriages, adapted to the purpose, is fed up to the saw; the cut staves passing into the above named channels, are retained by them until they are completely separated from the block, when they fall down by their own gravity, without any possibility of their being carried round by, and injuring, the saw.

For the purpose of sustaining, and feeding the stuff to the saws, there are four carriages, with their appendages, each of the same construction, there being also four vertical frames surrounding the saw, to sustain the respective carriages. To guide the carriages, there are curved ways, adapted to the curvature of the saw, up which the carriage slides, the whole being usually made of iron. The timber is received upon the carriage and rests at bottom upon a ledge, or rabbetted piece of iron, forming its lower end, and also upon the teeth of a small feed wheel, by the revolving of which, and of another similar wheel which bears upon its upper end, the timber is, by a self-feeding apparatus, fed to the saw at the time required. The shaft of the saw may be driven by means of a whirl and band, or by any suitable gearing; the moving up of the carriage to feed the stuff to the saw is thus effected. There is upon the back side of the carriage, extending along its middle, and from one end to the other, a curved rack, and into this rack the worm of an endless screw engages, which endless screw is cut upon a vertical revolving shaft, extending from the carriage up to the top of the frame of the machine; a band from the shaft of the revolving saw passes around a whirl on this screw shaft, which by its revolution causes the carriage to ascend. The step of this endless screw shaft is upon a shifting, or jointed, piece of metal which admits the screw to be thrown out of gear with the rack; and this being done at the moment the carriage has risen to the height necessary for the complete separation of the stave from the block, the carriage again descends upon the ways by its own gravity. When it arrives at the bottom, the feed wheels which bear against the ends of the stuff are turned, so as to feed it to the thickness of another stave, and the endless screw, also, is thrown into gear with the rack.

To produce the feeding the gudgeons of the feed-wheels pass through the carriage, and have upon them, at the back side of the carriage, tail pieces which act upon the wheels by passing into guide grooves, and thus causing them to revolve to the required extent. The precise mode of doing this, or of throwing the endless screw into, and out, of gear, does not require to be described, as such motions are familiar to every competent machinist, and may be varied in numerous ways. The upper feed-wheel is so constructed as to move up and down, to a short distance, in order to adjust it to the varying length of the stuff to be sawed; it has above it a setting screw, to force it down, or raise it, as may be required.

The timber, while being cut, must be held firmly against the carriage, and this I effect in the following manner. A bar of iron passes up in front of, and nearly in contact with, the timber, along that side of the carriage which is toward the saw, its ends being firmly secured to the carriage. A pin passing through the middle of this bar, constitutes the fulcrum of the lever by which the timber is fastened to the carriage; the head, or end, of this lever through which this pin passes, is an eccentric, and when the lever is raised, it is withdrawn from the timber, but when it is depressed so as to stand at right angles, or nearly so, with the timber, it is forcibly held by it against the carriage. The eccentric forms the short end of this lever, and the long end is of sufficient weight to produce the required pressure. When the carriage descends the long end of this lever comes in contact with a latch which disengages it from the timber, and allows the feeding-wheels to act; but when it ascends, this latch is raised, and allows it to pass up unobstructed.

In order to insure the throwing of the vertical shaft in and out of gear, I usually suspend a weight to a rod, or a system of levers connected therewith; but springs, or other devices, may be used for this purpose, and I mention this weight only because it is represented in the drawing deposited in the Patent Office, which was taken from a small, operating machine.

Having thus, fully described my said invention, and the manner in which the respective parts of this improved machine operate in producing the intended effect, I do hereby declare that I do not intend to claim these individual parts, generally, as new, or as of my invention; but I do claim the manner in which I have combined them together, to produce a new and useful effect, thereby constituting a machine substantially new. I do not, for example, claim to be the inventor of the barrel saw; but I do claim—

1. The placing within such a saw, a permanent block of wood, or other analogous contrivance, grooved, or channeled, to receive the staves to be cut, in the manner described.

2. And it is to be distinctly understood, that I claim the position and mode of running the saw, in combination with the stationary bulged block within it, separately and distinctly from the carriages and their appendages, as constructed by me; as such carriages may have appended to them, apparatus for setting and holding the stuff, differently combined and arranged from that herein described.

JESSE J. SMITH.

Witnesses:
HIRAM ATKINSON,
THOMAS B. ATKINSON.